United States Patent
Yokogawa (10) Patent No.: US 8,692,253 B2
(45) Date of Patent: Apr. 8, 2014

(54) FLAT PANEL DISPLAY

(75) Inventor: Akira Yokogawa, Ishikawa-gun (JP)

(73) Assignee: Japan Display Inc., Tokyo (JP)

( * ) Notice: Subject to any disclaimer, the term of this patent is extended or adjusted under 35 U.S.C. 154(b) by 97 days.

(21) Appl. No.: 13/161,869

(22) Filed: Jun. 16, 2011

(65) Prior Publication Data

US 2011/0316008 A1    Dec. 29, 2011

(30) Foreign Application Priority Data

Jun. 24, 2010  (JP) ................................ 2010-144120
Apr. 28, 2011  (JP) ................................ 2011-101900

(51) Int. Cl.
*H01L 29/10*    (2006.01)

(52) U.S. Cl.
USPC ............... 257/59; 257/72; 257/409; 257/443; 257/E27.13; 257/E27.15; 345/156; 345/530; 349/1; 349/149

(58) Field of Classification Search
USPC ............ 257/59, 72, E27.132, E27.152, 5, 40, 257/202, 222, 225, 257, 290, 258, 291, 409, 257/414, 431, 443, 440, 444, E31.097, 257/E27.13, E27.133, E27.134, E27.15, 257/E27.159; 345/156, 204, 214, 530; 349/40, 41, 42, 1, 149

See application file for complete search history.

(56) References Cited

U.S. PATENT DOCUMENTS

| | | | | |
|---|---|---|---|---|
| 7,943,934 B2 * | 5/2011 | Yoon et al. | ........................ | 257/59 |
| 2007/0273802 A1 * | 11/2007 | Nakamura | ........................ | 349/40 |
| 2008/0002319 A1 * | 1/2008 | Moon et al. | ........................ | 361/56 |

FOREIGN PATENT DOCUMENTS

| | | |
|---|---|---|
| JP | 8-179359 | 7/1996 |
| JP | 8-328033 A | 12/1996 |
| JP | 11-72806 A | 3/1999 |
| JP | 2001-117112 A | 4/2001 |
| JP | 2005-266111 A | 9/2005 |
| JP | 2006-267605 A | 10/2006 |
| JP | 2008-164787 A | 7/2008 |

OTHER PUBLICATIONS

Office Action issued Jun. 4, 2013 in Japanese Patent Application No. 2011-101900 with English language translation.

* cited by examiner

*Primary Examiner* — Cuong Q Nguyen
*Assistant Examiner* — Galina Yushina
(74) *Attorney, Agent, or Firm* — Oblon, Spivak, McClelland, Maier & Neustadt, L.L.P.

(57) ABSTRACT

According to one embodiment, a flat panel display includes a first mounting portion including a first input pad and a first output pad, a second mounting portion including a second input pad and a second output pad, a first common terminal and a second common terminal, which have a common potential, and a guard ring wiring which is formed in a manner to extend from the first common terminal, to pass between the first input pad and the first output pad of the first mounting portion, to pass between the second input pad and the second output pad of the second mounting portion, and to reach the second common terminal, the guard ring wiring including a first resistor element of a first resistance value and a second resistor element of a second resistance value which is higher than the first resistance value.

33 Claims, 9 Drawing Sheets

FLAT PANEL DISPLAY

CROSS-REFERENCE TO RELATED APPLICATIONS

This application is based upon and claims the benefit of priority from Japanese Patent Applications No. 2010-144120, filed Jun. 24, 2010; and No. 2011-101900, filed Apr. 28, 2011; the entire contents of both of which are incorporated herein by reference.

FIELD

Embodiments described herein relate generally to a flat panel display.

BACKGROUND

By virtue of such features as light weight, small thickness and low power consumption, liquid crystal display devices have been used in various fields as display devices of OA equipment such as a personal computer, a TV, etc. In recent years, liquid crystal display devices have also been used as display devices of a portable information terminal device such as a mobile phone or a PDA (personal digital assistant), a car navigation apparatus, and a game machine, etc.

In the process of manufacturing the liquid crystal display device, a countermeasure to static electricity is indispensable. For example, dielectric breakdown of various wiring lines or switching elements in the active area may occur due to static electricity which has occurred in the manufacturing process or static electricity which has entered from the outside. As a countermeasure to such static electricity, for example, there is known a technique wherein the gate electrodes of two protection TFTs (configured such that their source electrodes and drain electrodes are connected in parallel in a reverse direction) which constitute a protection element are formed integral with either a gate line or a relay electrode, which is connected to a short-circuit line formed on an excess portion of the substrate.

DETAILED DESCRIPTION

In general, according to one embodiment, a flat panel display includes an insulative substrate; a first mounting portion including a first input pad and a first output pad, which are formed above the insulative substrate; a second mounting portion including a second input pad and a second output pad, which are formed above the insulative substrate; a first common terminal and a second common terminal, which have a common potential and are formed above the insulative substrate; and a guard ring wiring which is formed above the insulative substrate in a manner to extend from the first common terminal, to pass between the first input pad and the first output pad of the first mounting portion, to pass between the second input pad and the second output pad of the second mounting portion, and to reach the second common terminal, the guard ring wiring including a first resistor element of a first resistance value and a second resistor element of a second resistance value which is higher than the first resistance value.

According to another embodiment, a flat panel display includes an insulative substrate including a substrate end extending in a first direction; output pads arranged in the first direction above the insulative substrate; input pads arranged in the first direction, more on the substrate end side than the output pads above the insulative substrate; connection pads arranged in the first direction, more on the substrate end side than the input pads above the insulative substrate, the connection pads being connected to the input pads; and a guard ring wiring extending in the first direction between the output pads and the input pads above the insulative substrate, the guard ring wiring including a plurality of resistor elements.

According to another embodiment, a flat panel display includes an insulative substrate; a gate line formed above the insulative substrate, the gate line extending in a first direction in an active area which displays an image; a source line formed above the insulative substrate, the source line extending in a second direction crossing the first direction in the active area; and a guard ring wiring which is formed outside the active area above the insulative substrate, includes a plurality of resistor elements, and is electrically insulated from the gate line and the source line.

Embodiments will now be described in detail with reference to the accompanying drawings. In the drawings, structural elements having the same or similar functions are denoted by like reference numerals, and an overlapping description is omitted.

Figure 1:
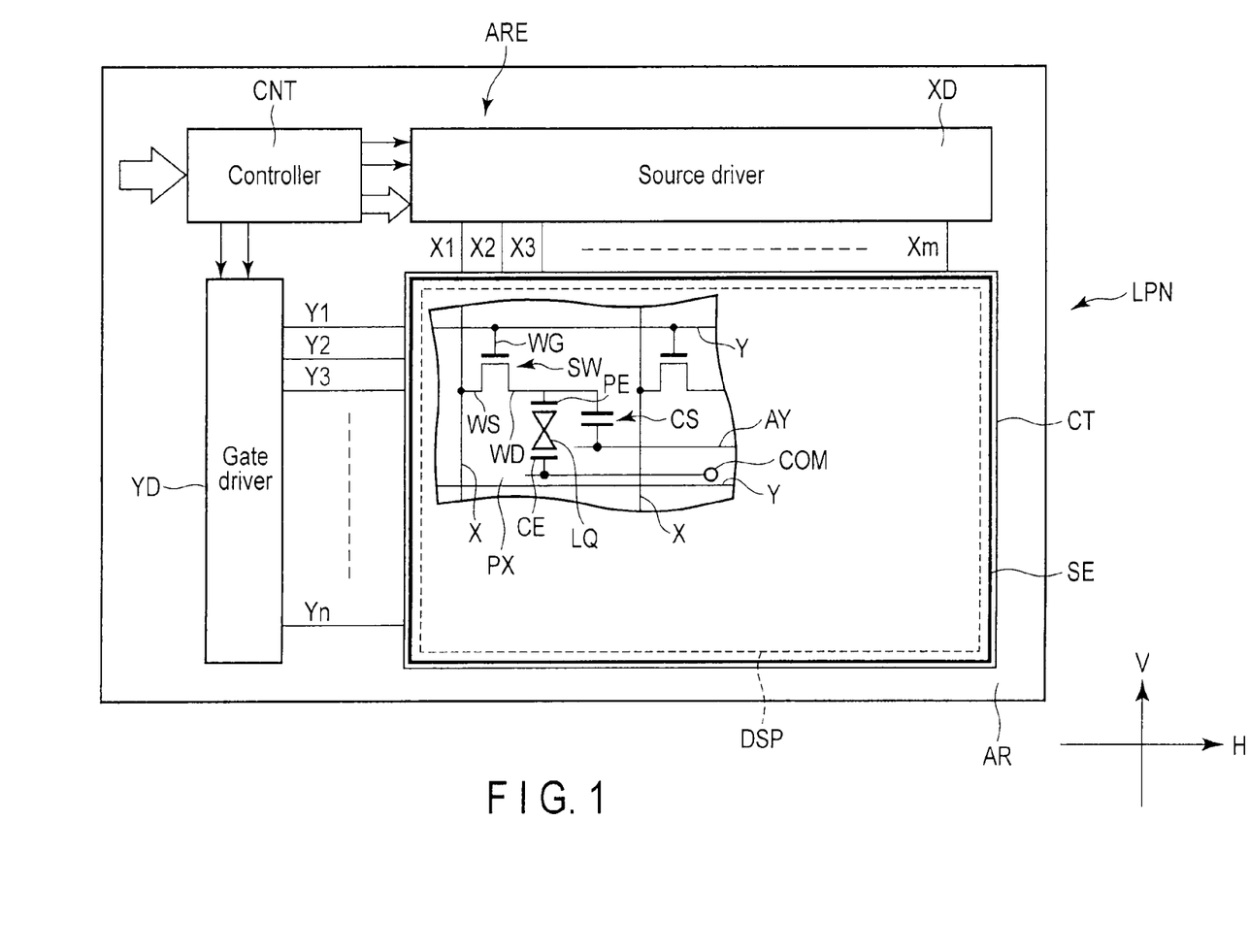
FIG. 1 is a view which schematically shows the structure of a flat panel display according to an embodiment.

FIG. 1 schematically shows the structure of a flat panel display according to an embodiment. FIG. 1 schematically shows the structure of a liquid crystal display device as an example of the flat panel display.

This liquid crystal display device is, for example, an active-matrix-type liquid crystal display device, and includes a substantially rectangular plate-shaped liquid crystal display panel LPN. The liquid crystal display panel LPN is configured to include an array substrate AR, a counter-substrate CT which is disposed to be opposed to the array substrate AR, and a liquid crystal layer LQ which is disposed between the array substrate AR and the counter-substrate CT. The array substrate AR and the counter-substrate CT are attached by a sealant SE.

The liquid crystal display panel LPN includes, in an inside thereof surrounded by the sealant SE, an active area DSP which displays an image. The active area DSP is formed, for example, in a quadrangular shape (especially, a rectangular shape), and is composed of a plurality of pixels PX which are arrayed in a matrix of m×n (m and n are positive integers).

The array substrate AR includes, in the active area DSP, an n-number of gate lines Y (Y1 to Yn), an m-number of source lines X (X1 to Xm), and storage capacitance lines AY. The gate lines Y extend in a first direction H. The source lines X extend in a second direction V crossing the first direction H. The gate lines Y and source lines X cross each other via an insulative film. In this example, the first direction H and second direction V are substantially perpendicular. The storage capacitance lines AY extend in the first direction H, substantially in parallel to the gate lines Y.

Each of the pixels PX of the active area DSP includes a switching element SW, a pixel electrode PE and a counter-electrode CE. The switching element SW and the pixel electrode PE are provided in the array substrate AR. The counter-electrode CE may be provided in the array substrate AR, or may be provided in the counter-substrate CT. A storage capacitance CS is formed, for example, between the pixel electrode PE and the storage capacitance line AY.

The switching element SW is electrically connected to the gate line Y and source line X. The switching element SW is composed of, for instance, an n-channel thin-film transistor. A gate electrode WG of the switching element SW is electrically connected to the gate line Y (or formed integral with the gate line Y). A source electrode WS of the switching element SW is electrically connected to the source line X (or formed integral with the source line X). A drain electrode WD of the switching element SW is electrically connected to the pixel electrode PE.

The pixel electrode PE is electrically connected to the switching element SW. The counter-electrode CE is opposed to the pixel electrode PE of each pixel PX via the liquid crystal layer LQ in the active area DSP. The counter-electrode CE is electrically connected to a common terminal COM of a common potential. The common terminal COM is formed, for example, on the outside of the active area DSP of the array substrate AR. In the case where the counter-electrode CE is provided in the array substrate AR, the counter-electrode CE is electrically connected to the common terminal COM via a wiring formed in the array substrate AR. In the case where the counter-electrode CE is provided in the counter-substrate CT, the counter-electrode CE is electrically connected to the common terminal COM on the array substrate AR side via an electrically conductive member (not shown).

The n-number of gate lines Y are led to the outside of the active area DSP, and are connected to a gate driver YD. The m-number of source lines X are led to the outside of the active area DSP, and are connected to a source driver XD. In the meantime, at least a part which constitutes the gate driver YD and source driver XD is provided on the array substrate AR. In the present embodiment, at least a part of the function of the source driver XD is incorporated in one or more driving ICs which are mounted on the array substrate AR. The gate driver YD and source driver XD are controlled by a controller CNT. The controller CNT may not directly be mounted on the array substrate AR, and may be mounted on a flexible printed circuit (hereinafter referred to simply as "FPC") which is mounted on the liquid crystal display panel LPN.

In the example illustrated, the gate driver YD and source driver XD are disposed on an extension portion ARE of the array substrate AR, which extends outward from an end portion of the counter-substrate CT. The extension portion ARE is positioned outside the active area DSP. The gate driver YD is disposed along one side of the active area DSP, which is substantially parallel to the second direction V. The source driver XD is disposed along one side of the active area DSP, which is substantially parallel to the first direction H.

Figure 2:
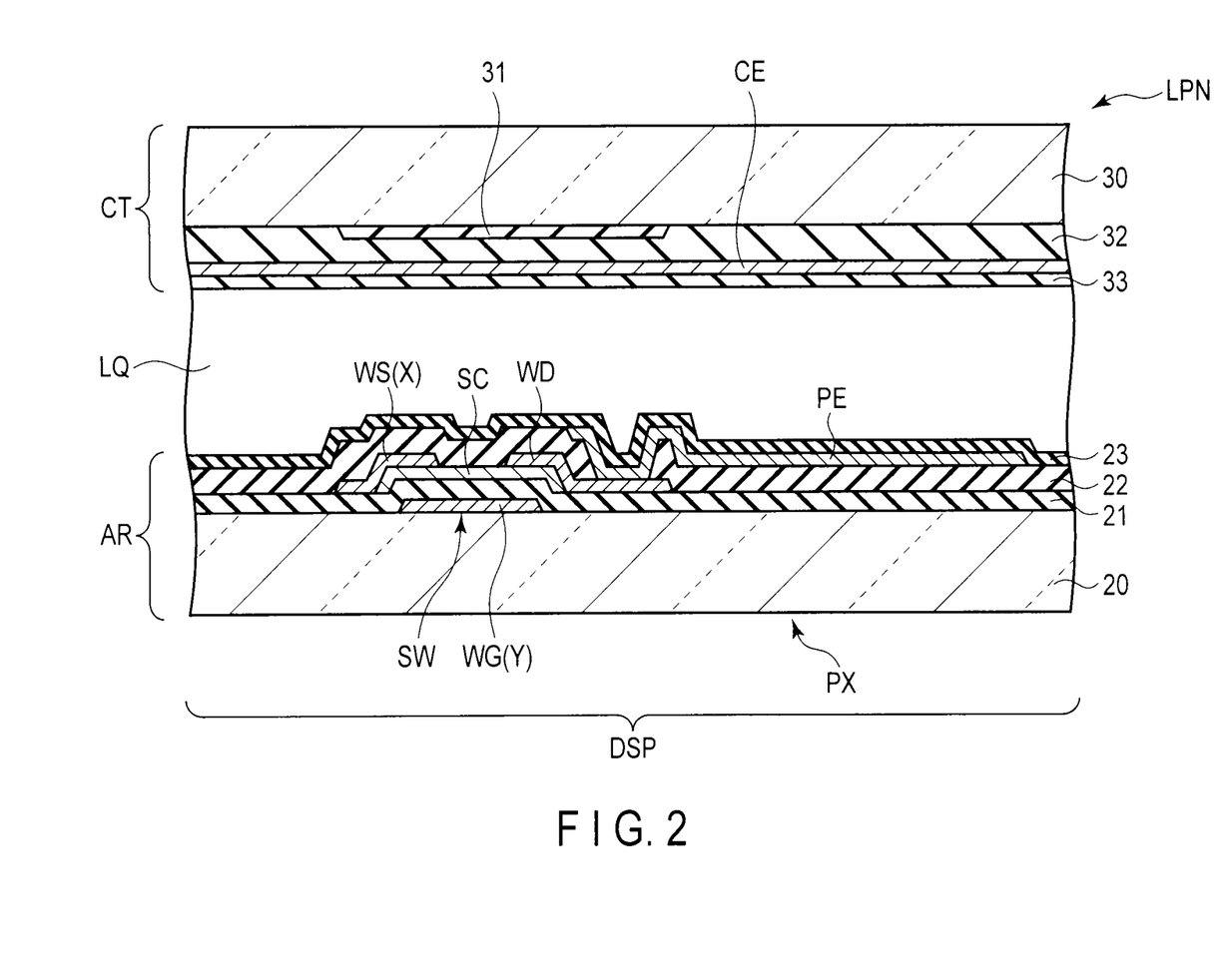
FIG. 2 is a cross-sectional view which schematically shows the structure of a liquid crystal display panel shown in FIG. 1.

FIG. 2 is a cross-sectional view which schematically shows the structure of the liquid crystal display panel LPN shown in FIG. 1. FIG. 2 shows a cross section of one pixel PX in the active area DSP.

Specifically, the array substrate AR is formed by using a first insulative substrate 20 having light transmissivity, such as a glass substrate or a plastic substrate. The array substrate AR includes a gate line Y, a source line X, a switching element SW and a pixel electrode PE which are formed on the first insulative substrate 20. The switching element SW shown in this Figure is a bottom-gate-type thin-film transistor, and includes a semiconductor layer (first semiconductor layer) SC which is formed of amorphous silicon. However, the structure of the switching element SW is not limited to this example. For example, the switching element SW may be a top-gate-type thin-film transistor, and the semiconductor layer SC may be formed of other semiconductor material such as polysilicon.

A gate electrode WG of the switching element SW is formed on the first insulative substrate 20. The gate electrode WG is electrically connected to the gate line Y which is formed on the first insulative substrate 20. In the example illustrated, the gate electrode WG is formed integral with the gate line Y. The gate electrode WG is covered with a first interlayer insulation film 21. The first interlayer insulation film 21 is also disposed on the first insulative substrate 20.

The semiconductor layer SC of the switching element SW is formed on the first interlayer insulation film 21. The semiconductor layer SC is disposed immediately above the gate electrode WG. A source electrode WS and a drain electrode WD of the switching element SW are formed on the first interlayer insulation film 21, and at least parts thereof are in contact with the semiconductor layer SC.

The source electrode WS is electrically connected to the source line X. In the example illustrated, the source electrode WS is formed integral with the source line X. The source electrode WS and drain electrode WD are covered with a second interlayer insulation film 22. The second interlayer insulation film 22 is also disposed on the first interlayer insulation film 21. The first interlayer insulation film 21 and second interlayer insulation film 22 are formed of an inorganic material such as silicon nitride (SiN).

The pixel electrode PE is formed on the second interlayer insulation film 22. The pixel electrode PE is connected to the drain electrode WD via a contact hole which penetrates the second interlayer insulation film 22. The pixel electrode PE is formed of a transparent oxide electrically conductive material such as indium tin oxide (ITO) or indium zinc oxide (IZO). The pixel electrode PE and the second interlayer insulation film 22 are covered with a first alignment film 23.

On the other hand, the counter-substrate CT is formed by using a second insulative substrate 30 having light transmissivity, such as a glass substrate or a plastic substrate. The counter-substrate CT includes a black matrix 31 and a color filter layer 32 on the second insulative substrate 30 (the surface facing the array substrate AR) in the active area DSP. In the example illustrated, the counter-substrate CT includes a counter-electrode CE.

The black matrix 31 is opposed to the switching element SW formed in the array substrate AR and various wiring portions such as the above-described gate line Y and source line X, which are formed between pixels PX in the active area DSP. The black matrix 31 may be formed of a light-blocking metallic material such as a black-colored resin material or chromium (Cr). The color filter layer 32 is disposed in each of the pixels PX which are partitioned by the black matrix in the active area DSP. A part of the color filter layer 32 overlaps the black matrix 31.

The counter-electrode CE is formed on the color filter layer 32 in the active area DSP, and is opposed to the pixel electrode PE of each pixel PX via the liquid crystal layer LQ. The counter-electrode CE is formed of a transparent oxide electrically conductive material such ITO or IZO. The counter-electrode CE is covered with a second alignment film 33.

The above-described array substrate AR and counter-substrate CT are disposed such that their first alignment film 23 and second alignment film 33 are opposed. In this case, spacers (e.g. columnar spacers which are formed of resin material so as to be integral with one of the substrates), which are not shown, are disposed between the array substrate AR and counter-substrate CT, and thereby a predetermined cell gap is created.

The liquid crystal layer LQ is sealed in the above-described cell gap. Specifically, the liquid crystal layer LQ is composed of a liquid crystal composition which is held between the pixel electrode PE of the array substrate AR and the counter-electrode CE of the counter-substrate CT.

The structure of the liquid crystal display panel LPN is not limited to the above-described structure, and the counter-electrode CE, as well as the pixel electrodes PE, may be provided on the array substrate AR. In addition, the liquid crystal mode is not particularly limited. Applicable liquid crystal modes include a mode which mainly makes use of a vertical electric field or an oblique electric field, such as a TN (Twisted Nematic) mode, an OCB (Optically Compensated Bend) mode or a VA (Vertical Aligned) mode, and a mode which mainly makes use of a transverse electric field, such as an IPS (In-Plane Switching) mode or an FFS (Fringe Field Switching) mode.

Figure 3:
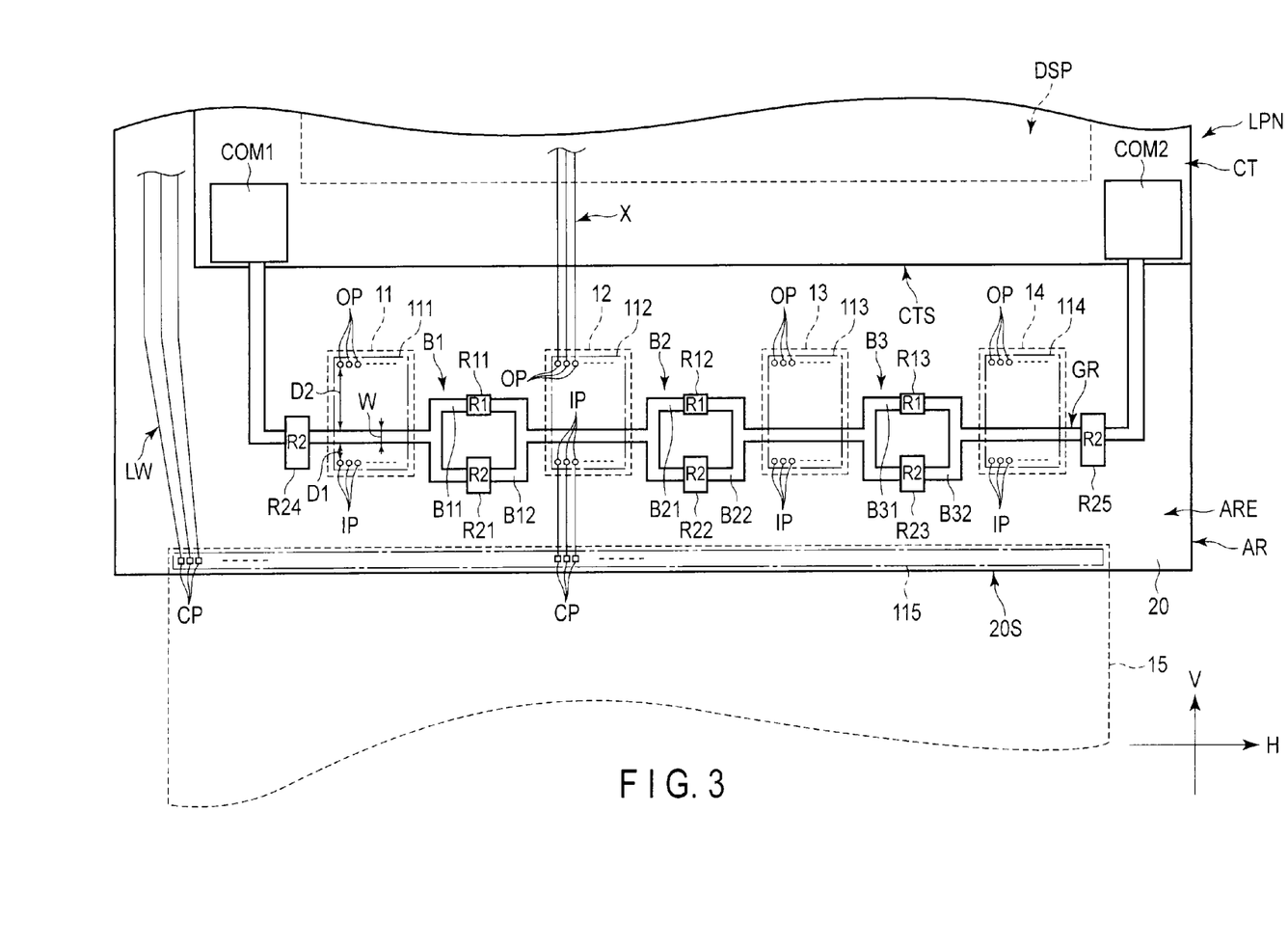
FIG. 3 is a top view which schematically shows a structure example of a guard ring wiring which is formed on an array substrate of the liquid crystal display panel shown in FIG. 1.

FIG. 3 is a top view which schematically shows a structure example of a guard ring wiring GR which is formed on the array substrate AR of the liquid crystal display panel LPN shown in FIG. 1. FIG. 3 shows the guard ring wiring GR which is formed on an extension portion ARE of the array substrate AR, which extends outward from an end portion CTS of the counter-substrate CT.

In the example illustrated, four driving ICs 11 to 14, which incorporate source drivers, respectively, and an FPC substrate 15 are mounted on the extension portion ARE. In FIG. 3, as indicated by broken lines, the driving ICs 11 to 14 and the FPC substrate 15 are mounted on the extension portion ARE along a substrate end 20S which is included in the first insulative substrate 20. The substrate end 20S extends in the first direction H.

IC mounting portions 111 to 114, on which the driving ICs 11 to 14 are mounted, and an FPC mounting portion 115, on which the FPC substrate 15 is mounted, are formed on the extension portion ARE which is formed along the substrate end 20S. The IC mounting portions 111 to 114 and FPC mounting portion 115 are indicated by dot-and-dash lines in FIG. 3.

Each of the IC mounting portions 111 to 114 includes input pads IP which are connected to input terminals of the driving IC, and output pads OP which are connected to output terminals of the driving IC. A plurality of such output pads OP are formed such that they are arranged along the first direction H on the first insulative substrate 20. The respective output pads OP are electrically connected to the source lines X which extend toward the active area DSP. FIG. 3 shows the state in which three output pads OP of the IC mounting portion 112 are connected to the source lines X, but the other output pads OP are connected to the source lines, which are not shown. The plural input pads IP are formed such that they are arranged along the first direction H, more on the substrate end 20S side than the output pads OP on the first insulative substrate 20.

The FPC mounting portion 115 includes connection pads CP which are connected to output terminals of the FPC substrate 15. The plural connection pads CP are formed such that they are arranged along the first direction H, more on the substrate end 20S side than the input pads IP on the first insulative substrate 20. The respective connection pads CP are electrically connected to the input pads IP. FIG. 3 shows the state in which three input pads IP of the IC mounting portion 112 are connected to the connection pads CP, but the other input pads IP are connected to the connection pads CP, which are not shown. In the meantime, some of the connection pads CP are electrically connected to wiring lines LW. The wiring lines LW are connected to a gate driver, etc., which are not shown.

The input pads IP, output pads OP and connection pads CP are formed of at least one of a first conducive layer which is formed, like the gate lines, on the first insulative substrate 20, and is formed of the same material as the gate lines, a second conducive layer which is formed, like the source lines, on the first interlayer insulation film 21, and is formed of the same material as the source lines, and a third conducive layer which is formed, like the pixel electrodes, on the second interlayer insulation film 22, and is formed of the same material as the pixel electrodes. The input pads IP, output pads OP and connection pads CP are exposed on the surface of the array substrate AR.

The guard ring wiring GR is formed on the outside of the active area DSP on the first insulative substrate 20. The guard ring wiring GR is electrically connected to common terminals of a common potential.

In the example illustrated, the guard ring wiring GR is electrically connected to a first common terminal COM1 and a second common terminal COM2. The first common terminal COM1 and second common terminal COM2 are formed in areas on the first insulative substrate 20, which are covered with the counter-substrate CT, and are electrically connected to the above-described counter-electrode CE. Specifically, the guard ring wiring GR has a common potential and is electrically insulated from the gate lines Y and source lines X which are formed in the active area DSP.

The guard ring wiring GR extends in the first direction H between the output pads OP and input pads IP in the IC mounting portions 111 to 114. In other words, each output pad OP is formed more on the active DSP side than the guard ring wiring GR, and each input pad IP is formed more on the substrate end 20S side or connection pad CP side than the guard ring wiring GR.

In the example illustrated, the guard ring GR is formed between the first common terminal COM1 and second common terminal COM2. Specifically, the guard ring wiring GR is formed such that the guard ring wiring GR extends from the first common terminal COM1, passes between the input pads IP and output pads OP of the IC mounting portion 111, passes between the input pads IP and output pads OP of the IC mounting portion 112, passes between the input pads IP and output pads OP of the IC mounting portion 113, passes between the input pads IP and output pads OP of the IC mounting portion 114, and reaches the second common terminal COM2.

In the present embodiment, the guard ring wiring GR includes a plurality of resistor elements. In the example illustrated, the guard ring wiring GR includes first resistor elements R1 of a first resistance value and second resistor elements R2 of a second resistance value which is higher than the first resistance value. In the guard ring wiring GR, the first resistor element R1 and second resistor element R2 are formed between the IC mounting portion 111 and IC mounting portion 112, between the IC mounting portion 112 and IC mounting portion 113, and also between the IC mounting portion 113 and IC mounting portion 114. The first resistor element R1 and second resistor element R2 are electrically connected in parallel. In addition, in the guard ring wiring GR, the second resistor element R2 is formed between the first common terminal COM1 and the IC mounting portion 111, and also between the second common terminal COM2 and the IC mounting portion 114.

More concrete examples will be described below.

The guard ring wiring GR includes a midway portion which is branched to a plurality of paths, at least one midway location along the guard ring wiring GR. In the example illustrated, the guard ring wiring GR includes three midway portions B1 to B3. Specifically, the guard ring wiring GR includes a midway portion B1 which is located between the IC mounting portion 111 and IC mounting portion 112, a midway portion B2 which is located between the IC mounting portion 112 and IC mounting portion 113, and a midway portion B3 which is located between the IC mounting portion 113 and IC mounting portion 114.

In the example illustrated, each of the midway portions B1 to B3 is branched to two paths, and includes a first wiring portion and a second wiring portion which serve as the respective paths. Specifically, the midway portion B1 includes a first wiring portion B11 which is electrically connected via a first resistor element R11, and a second wiring portion B12 which is electrically connected via a second resistor element R21 which is in parallel to the first resistor element R11. Similarly, the midway portion B2 includes a first wiring portion B21 which is electrically connected via a first resistor element R12, and a second wiring portion B22 which is electrically connected via a second resistor element R22 which is in parallel to the first resistor element R12. Similarly, the midway portion B3 includes a first wiring portion B31 which is electrically connected via a first resistor element R13, and a second wiring portion B32 which is electrically connected via a second resistor element R23 which is in parallel to the first resistor element R13. The first resistors R11 to R13 have substantially the same structure.

The guard ring wiring GR further includes a second resistor element R24 which is formed between the first common terminal COM1, shown on the left side in FIG. 3, and the IC mounting portion 111, and a second resistor element R25 which is formed between the IC mounting portion 114 and the second common terminal COM2 shown on the right side in FIG. 3. The second resistors R21 to R25 have substantially the same structure.

The guard ring wiring GR extends from the first common terminal COM1, passes through the IC mounting portion 111 (or passes immediately below the driving IC 11) via the second resistor element R24, branches into the two paths (the first wiring portion B11 including the first resistor element R11 and the second wiring portion B12 including the second resistor element R21) at the midway portion B1, and is then confluent again. Further, the guard ring wiring GR passes through the IC mounting portion 112 (or passes immediately below the driving IC 12), branches into the two paths (the first wiring portion B21 including the first resistor element R12 and the second wiring portion B22 including the second resistor element R22) at the midway portion B2, and is then confluent again. Then, the guard ring wiring GR passes through the IC mounting portion 113 (or passes immediately below the driving IC 13), branches into the two paths (the first wiring portion B31 including the first resistor element R13 and the second wiring portion B32 including the second resistor element R23) at the midway portion B3, and is then confluent again. Further, the guard ring wiring GR passes through the IC mounting portion 114 (or passes immediately below the driving IC 14), and reaches the second common terminal COM2 via the second resistor element R25.

The guard ring wiring GR, which passes through the IC mounting portions 111 to 114, are formed at a position closer to the input pads IP than to the output pads OP. An example of the dimensions is as follows. The wiring width W of the guard ring wiring GR is, e.g. 100 μm, the distance D1 in the second direction V between the input pad IP and the guard ring wiring GR is 30 μm, and the distance D2 in the second direction V between the output pad OP and the guard ring wiring GR is 400 μm. In this manner, the guard ring wiring GR is positioned with a bias to the input pad IP side between the input pad IP and the output pad OP.

In the meantime, the guard ring wiring GR of the present embodiment may include a single kind of resistor elements having the same resistance value, or may include three or more kinds of resistor elements having different resistance values. In addition, in the present embodiment, the plural resistor elements which are included in the guard ring wiring GR may be connected in series or may be connected in parallel. Besides, some of the resistor elements may be connected in series, and the other resistor elements may be connected in parallel.

Next, concrete examples of connection of resistor elements in the guard ring wiring GR are described. In the description below, the midway portion B2 between the IC mounting portion 112 and IC mounting portion 113 in the guard ring wiring GR is described by way of example.

Figure 4:
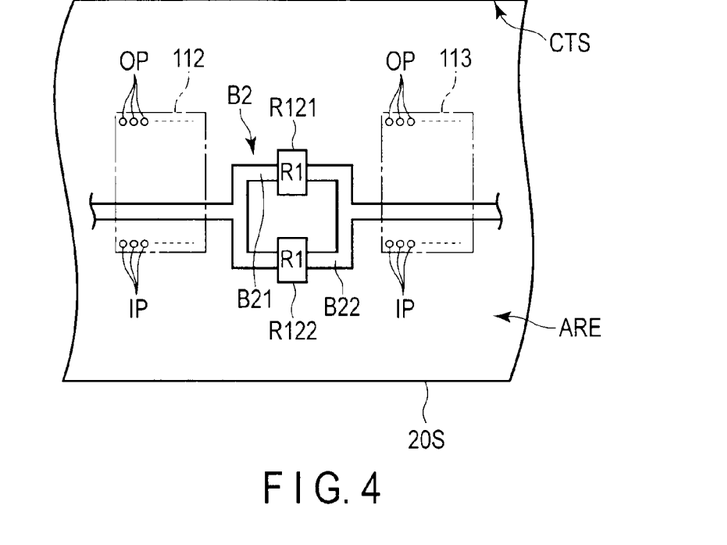
FIG. 4 is a plan view which schematically shows another structure example of the guard ring wiring in the embodiment.

In an example shown in FIG. 4, in a midway portion B2 including a first wiring portion B21 and a second wiring portion B22 which are branched, the first wiring portion B21 is electrically connected via a first resistor element R121, and the second wiring portion B22 is electrically connected via a first resistor element R122.

Figure 5:
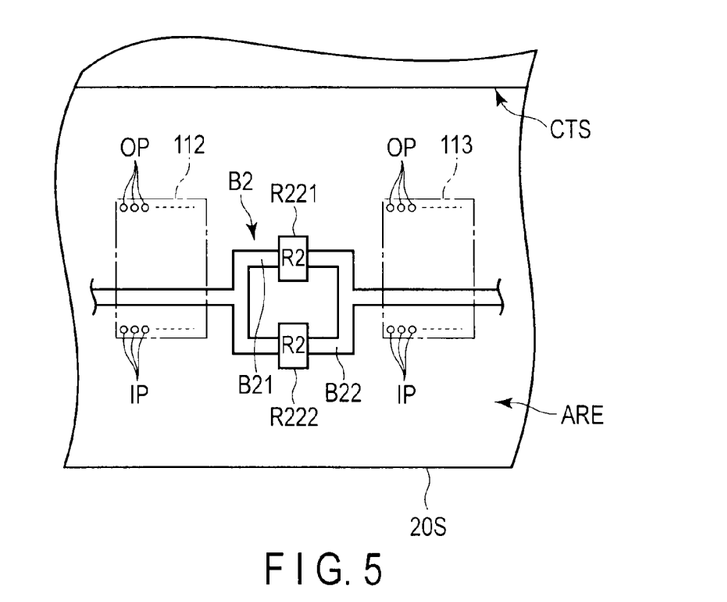
FIG. 5 is a plan view which schematically shows still another structure example of the guard ring wiring in the embodiment.

In an example shown in FIG. 5, in a midway portion B2 including a first wiring portion B21 and a second wiring portion B22 which are branched, the first wiring portion B21 is electrically connected via a second resistor element R221, and the second wiring portion B22 is electrically connected via a second resistor element R222.

Figure 6:
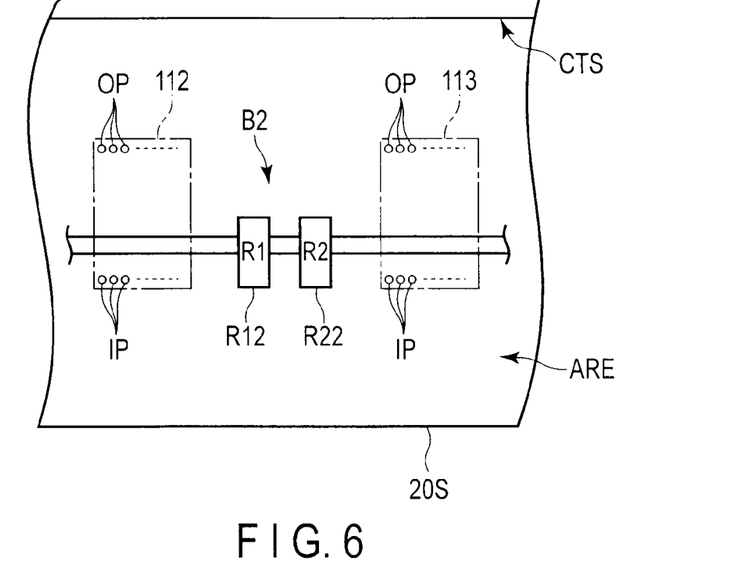
FIG. 6 is a plan view which schematically shows still another structure example of the guard ring wiring in the embodiment.

In an example shown in FIG. 6, in a midway portion B2 which is formed without a branch, a first resistor element R12 and a second resistor element R22 are connected in series.

Figure 7:
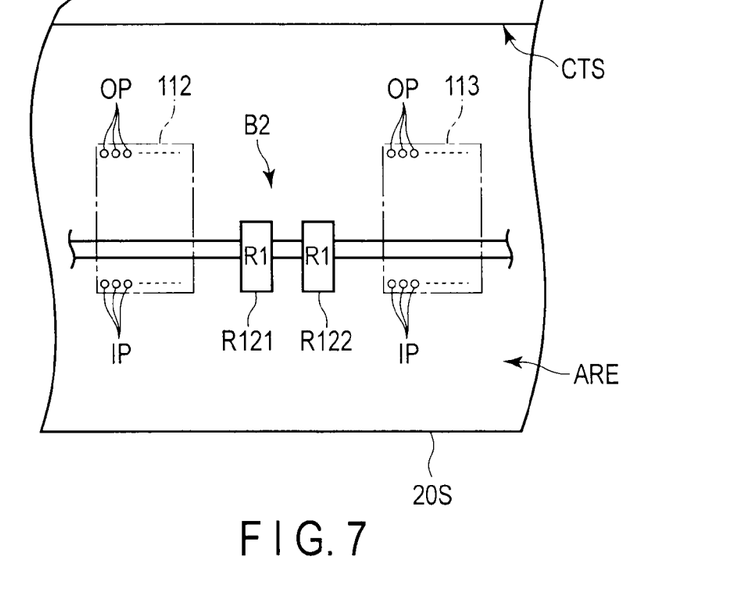
FIG. 7 is a plan view which schematically shows still another structure example of the guard ring wiring in the embodiment.

In an example shown in FIG. 7, in a midway portion B2 which is formed without a branch, a first resistor element R121 and a first resistor element R122 are connected in series.

Figure 8:
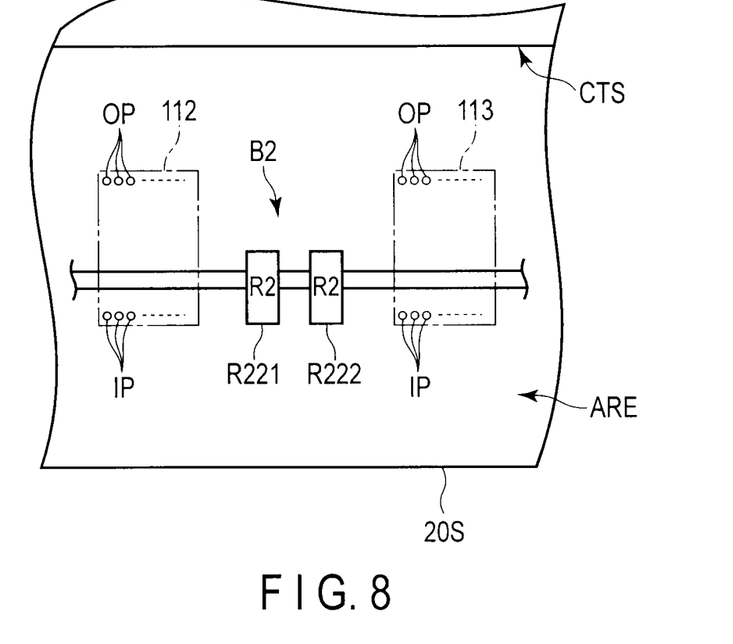
FIG. 8 is a plan view which schematically shows still another structure example of the guard ring wiring in the embodiment.

In an example shown in FIG. 8, in a midway portion B2 which is formed without a branch, a second resistor element R221 and a second resistor element R222 are connected in series.

Needless to say, each of the examples of connection shown in FIG. 4 to FIG. 8 is applicable to the other midway portions B1 and B3 of the guard ring wiring GR.

The guard ring wiring GR may be disposed not only on the extension portion ARE extending along the substrate 20S which is shown, but also on an extension portion ARE of any one of the other substrate ends which are not shown.

Next, an example of the concrete structure of the first resistor element R1 is described.

Figure 9:
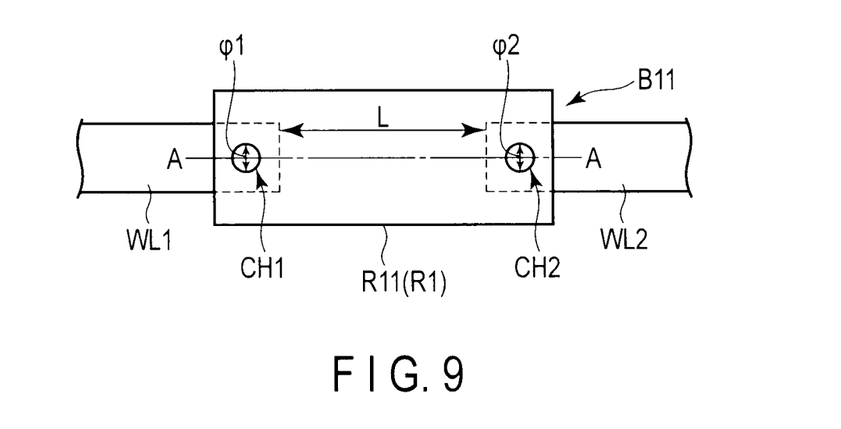
FIG. 9 is a plan view which schematically shows an example of the structure of a first resistor element included in the guard ring wiring of the embodiment.

FIG. 9 is a plan view which schematically shows an example of the structure of the first resistor element R1 shown in FIG. 3. In this example, the first resistor element R11, which is formed in the first wiring portion B11 of the midway portion B1, is described as the first resistor element R1. Since the other first resistor elements R12 and R13 have the same structure as the first resistor element R11, a description thereof is omitted.

Specifically, in the first wiring portion B11, one end portion WL1, which is formed on the left side in FIG. 9, is spaced apart from the other end portion WL2, which is formed on the right side in FIG. 9. The first resistor element R11 is a jumper portion which electrically connects the one end portion WL1 and the other end portion WL2. The first resistor element R11 is formed by using an electrically conductive layer which is formed in a layer that is different from a layer of the one end portion WL1 and the other end portion WL2. Specifically, an insulation film (not shown) is interposed between the first resistor element R11 and the one end portion WL1 and the other end portion WL2. Thus, the first resistor element R11 is electrically connected to the one end portion WL1 via a contact hole CH1 which is formed in the insulation film, and is also electrically connected to the other end portion WL2 via a contact hole CH2 which is formed in the insulation film. The one end portion WL1 and the other end portion WL2 may be formed by using electrically conductive layers of the same layer, or may be formed by using electrically conductive layers of different layers.

The first resistance value of the first resistor element R11 having this structure can be adjusted by a diameter $\phi 1$ of the contact hole CH1, a diameter $\phi 2$ of the contact hole CH2, and a distance L between the one end portion WL1 and the other end portion WL2 in the direction of extension of the first wiring portion B11. For example, as the diameter $\phi 1$ and diameter $\phi 2$ become smaller, the first resistance value decreases. In addition, as the distance L becomes longer, the first resistance value decreases.

Figure 10:
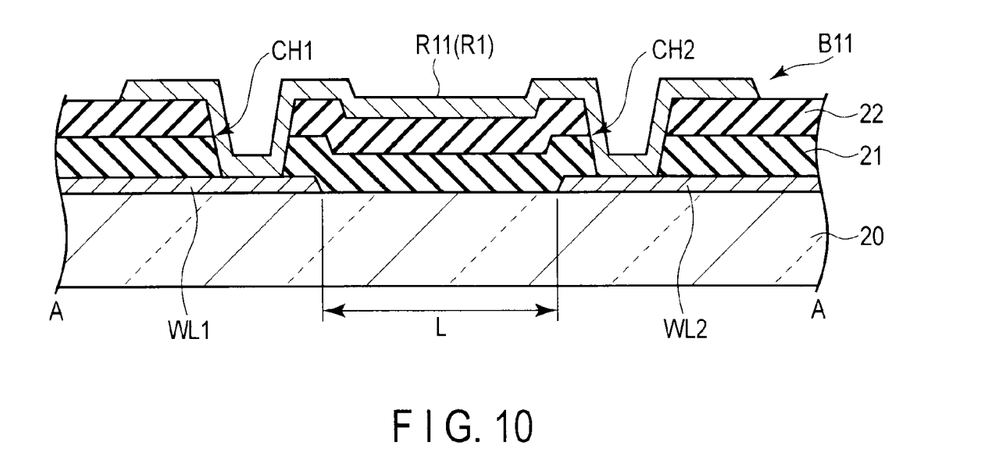
FIG. 10 is a cross-sectional view which schematically shows a cross-sectional structure, taken along line A-A, of the first resistor element shown in FIG. 9.

FIG. 10 is a cross-sectional view which schematically shows a cross-sectional structure, taken along line A-A, of the first resistor element R11 shown in FIG. 9.

In the example illustrated, one end portion WL1 and the other end portion WL2 are formed by using electrically conductive layers of the same layer. Specifically, the one end portion WL1 and the other end portion WL2 are formed on the first insulative substrate 20 with a distance L. The one end portion WL1 and the other end portion WL2, like the above-described gate line, correspond to a first electrically conductive layer. The one end portion WL1 and the other end portion WL2 are covered with the first interlayer insulation film 21.

The first resistor element R11 is formed on the second interlayer insulation film which is disposed on the first interlayer insulation film 21, and the first resistor element R11 extends from a point immediately above a part of the one end portion WL1 to a point immediately above a part of the other end portion WL2. The first resistor element R11, like the above-described pixel electrode, corresponds to a third electrically conductive layer. Specifically, the first resistor element R11 is formed of an oxide electrically conductive material such as ITO or IZO. The electrical resistance of this oxide electrically conductive material is higher than the electrical resistance of the electrically conductive material, of which the one end portion WL1 and the other end portion WL2 are formed.

The first resistor element R11 is put in contact with the one end portion WL1 via the contact hole CH1 which penetrates the first interlayer insulation film 21 and second interlayer insulation film 22 and reaches the one end portion WL1. In addition, the first resistor element R11 is put in contact with the other end portion WL2 via the contact hole CH2 which penetrates the first interlayer insulation film 21 and second interlayer insulation film 22 and reaches the other end portion WL2. Thereby, the first resistor element R11 electrically connects the one end portion WL1 and the other end portion WL2.

In the meantime, at least one of the one end portion WL1 and the other end portion WL2 of the first wiring portion B11 may be formed on the first interlayer insulation film 21.

Next, an example of the concrete structure of the second resistor element R2 is described.

Figure 11:
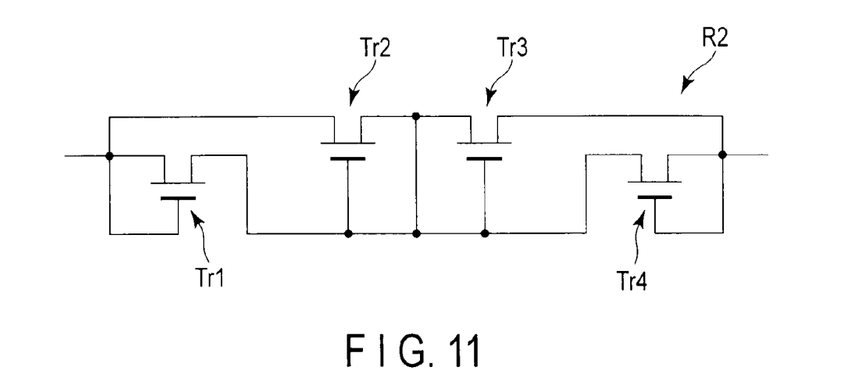
FIG. 11 is an equivalent circuit diagram corresponding to an example of the structure of a second resistor element included in the guard ring wiring of the embodiment.

FIG. 11 is an equivalent circuit diagram corresponding to an example of the structure of the second resistor element R2 shown in FIG. 3.

Specifically, the second resistor element R2 includes thin-film transistors. In the example illustrated, the second resistor element R2 includes four thin-film transistors Tr1 to Tr4. On one end side of the second resistor element R2, a gate electrode and a source electrode of the thin-film transistor Tr1 and a source electrode of the thin-film transistor Tr2 are connected to each other. A drain electrode of the thin-film transistor Tr1 is connected to a gate electrode of the thin-film transistor Tr2, a gate electrode of the thin-film transistor Tr3 and a source electrode of the thin-film transistor Tr4. A drain electrode of the thin-film transistor Tr2 is connected to a source electrode of the thin-film transistor Tr3. On the other end side of the second resistor element R2, a drain electrode of the thin-film transistor Tr3 and a gate electrode and a drain electrode of the thin-film transistor Tr4 are connected to each other.

Figure 12:
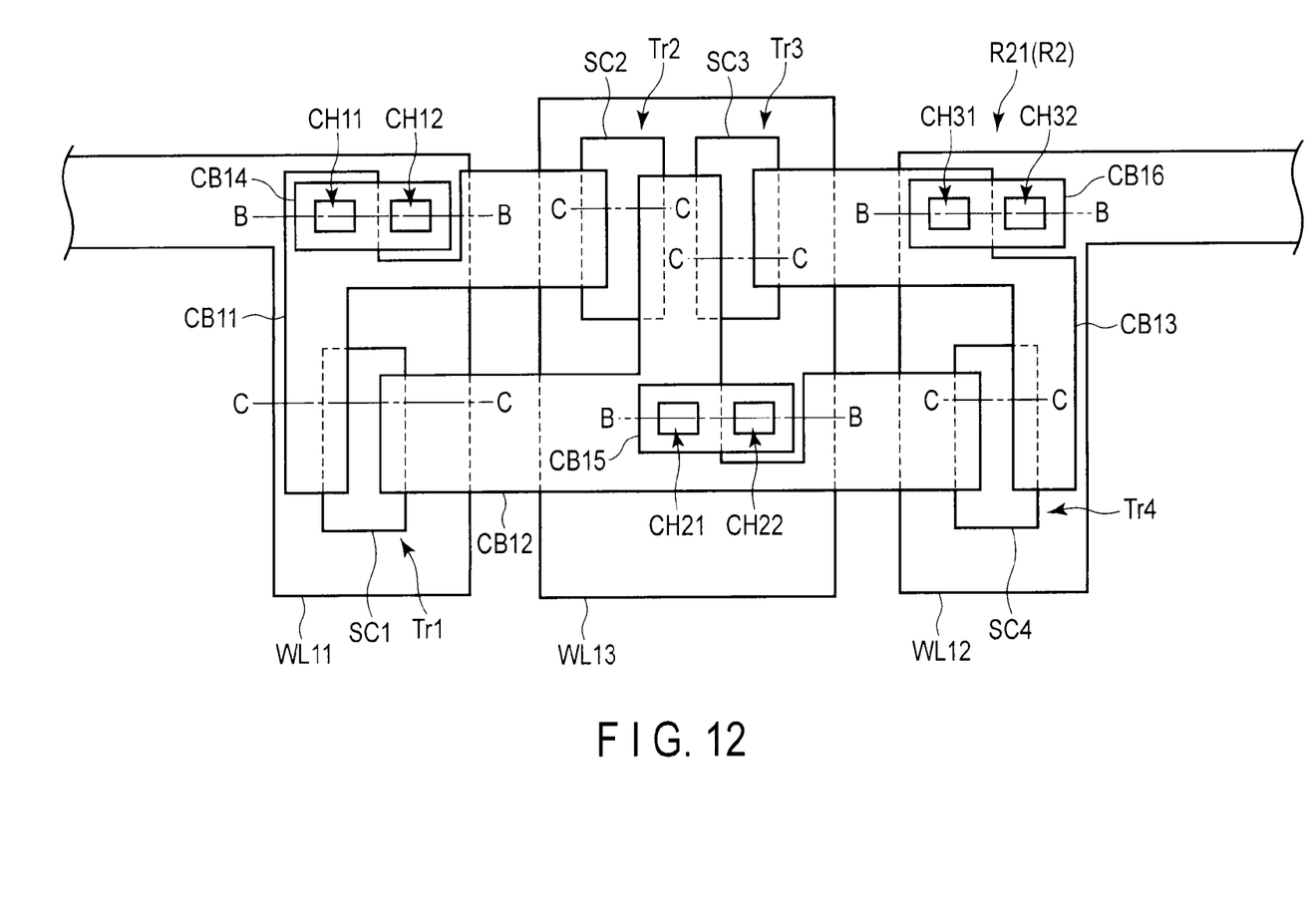
FIG. 12 is a plan view which schematically shows an example of the structure of the second resistor element shown in FIG. 11.

FIG. 12 is a plan view which schematically shows an example of the structure of the second resistor element R2 shown in FIG. 11. In this example, the second resistor element R21, which is formed in the second wiring portion B12 of the midway portion B1, is described as the second resistor element R2. Since the other second resistor elements R22 and R25 have the same structure as the second resistor element R21, a description thereof is omitted.

Specifically, in the second wiring portion B12, one end portion WL11, which is formed on the left side in FIG. 12, is spaced apart from the other end portion WL12, which is formed on the right side in FIG. 12. In addition, an island-shaped intermediate portion WL13 is formed between the one end portion WL11 and the other end portion WL12. Specifically, the intermediate portion WL13 is spaced apart from each of the one end portion WL11 and the other end portion WL12. The one end portion WL11, the other end portion WL12 and the intermediate portion WL13 are formed on, for example, the first insulative substrate 20, and are covered with the first interlayer insulation film 21.

An island-shaped semiconductor layer SC1 which constitutes the thin-film transistor Tr1, an island-shaped semiconductor layer SC2 which constitutes the thin-film transistor Tr2, an island-shaped semiconductor layer SC3 which constitutes the thin-film transistor Tr3, and an island-shaped semiconductor layer SC4 which constitutes the thin-film transistor Tr4 are formed on the first interlayer insulation film 21. The semiconductor layer SC1 is located on the one end portion WL11. The semiconductor layer SC2 and semiconductor layer SC3 are located on the intermediate portion WL13. The semiconductor layer SC4 is located on the other end portion WL12.

In addition, connectors CB11 to CB13 are formed on the first interlayer insulation film 21. The connector CB11 is located on the one end portion WL11 and is put in contact with the semiconductor layer SC1. In addition, a part of the connector CB11 extends onto the intermediate portion WL13 and is put in contact with the semiconductor layer SC2. In short, the connector CB11 electrically connects the semiconductor layer SC1 and semiconductor layer SC2.

The connector CB12 is located on the intermediate portion WL13, is spaced apart from the connector CB11, and is put in contact with the semiconductor layer SC2 and semiconductor layer SC3. In addition, a part of the connector CB12 extends onto the one end portion WL11, is spaced apart from the connector CB11, and is put in contact with the semiconductor SC1. Further, a part of the connector CB12 extends onto the other end portion WL12, and is put in contact with the semiconductor layer SC4. In short, the connector CB12 electrically connects the semiconductor layer SC1, semiconductor layer SC2, semiconductor layer SC3 and semiconductor layer SC4.

The connector CB13 is located on the other end portion WL12, is spaced apart from the connector CB12 and is put in contact with the semiconductor layer SC4. In addition, a part of the connector CB13 extends onto the intermediate portion WL13, is spaced apart from the connector CB12 and is put in contact with the semiconductor layer SC3. In short, the connector CB13 electrically connects the semiconductor layer SC3 and semiconductor layer SC4.

The above-described semiconductor layers SC1 to SC4 and connectors CB11 to CB13 are covered with the second interlayer insulation film 22. Connectors CB14 to CB16 are formed on the second interlayer insulation film 22.

The connector CB14 is put in contact with the connector CB11 via a contact hole CH11 which penetrates the second interlayer insulation film 22, and is put in contact with the one end portion WL11 via a contact hole CH12 which penetrates the first interlayer insulation film 21 and second interlayer insulation film 22. In short, the connector CB14 electrically connects the one end portion WL11 and the connector CB11.

The connector CB15 is put in contact with the connector CB12 via a contact hole CH21 which penetrates the second interlayer insulation film 22, and is put in contact with the intermediate portion WL13 via a contact hole CH22 which penetrates the first interlayer insulation film 21 and second interlayer insulation film 22. In short, the connector CB15 electrically connects the intermediate portion WL13 and the connector CB12.

The connector CB16 is put in contact with the connector CB13 via a contact hole CH31 which penetrates the second interlayer insulation film 22, and is put in contact with the other end portion WL12 via a contact hole CH32 which penetrates the first interlayer insulation film 21 and second interlayer insulation film 22. In short, the connector CB16 electrically connects the other end portion WL12 and the connector CB13.

Figure 13:
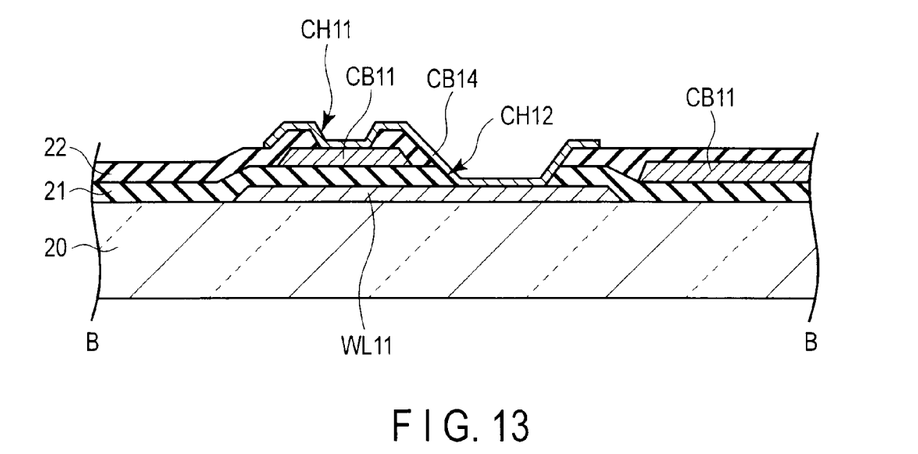
FIG. 13 is a cross-sectional view which schematically shows a cross-sectional structure, taken along line B-B, of the second resistor element shown in FIG. 12.

FIG. 13 is a cross-sectional view which schematically shows a cross-sectional structure, taken along line B-B, of the second resistor element R21 shown in FIG. 12. In this example, a description is given of the cross-sectional structure including the connector CB14 in the second resistor element R21. Since the other cross-sectional structures taken along line B-B in FIG. 12, that is, the cross-sectional structure including the connector CB15 and the cross-sectional structure including the connector CB16, are the same as the cross-sectional structure including the connector CB14, a description thereof is omitted.

The one end portion WL11 is formed on the first insulative substrate 20 and is covered with the first interlayer insulation film 21. The connector CB11 is formed on the first interlayer insulation film 21 and is covered with the second interlayer insulation film 22. While a part of the connector CB11 is located above the one end portion WL11, the connector CB11 is removed in a manner to expose the first interlayer insulation film 21 on the one end portion WL11. The contact hole CH11, which penetrates to the connector CB11, is formed in the second interlayer insulation film 22. In the region where the connector CB11 is removed, the contact hole CH12, which penetrates to the one end portion WL11, is formed in the first interlayer insulation film 21 and second interlayer insulation film 22. The connector CB14 is formed on the second interlayer insulation film 22. The connector CB14 is put in contact with the connector CB11 via the contact hole CH11 and is put in contact with the one end portion WL11 via the contact hole CH12, thereby electrically connecting the connector CB11 and the one end portion WL11.

In the example illustrated, the one end portion WL11 corresponds to a first electrically conductive layer which is formed of the same material as the above-described gate line. The connector CB11 corresponds to a second electrically conductive layer which is formed of the same material as the above-described source line. The connector CB14 corresponds to a third electrically conductive layer which is formed of the same material as the above-described pixel electrode.

Figure 14:
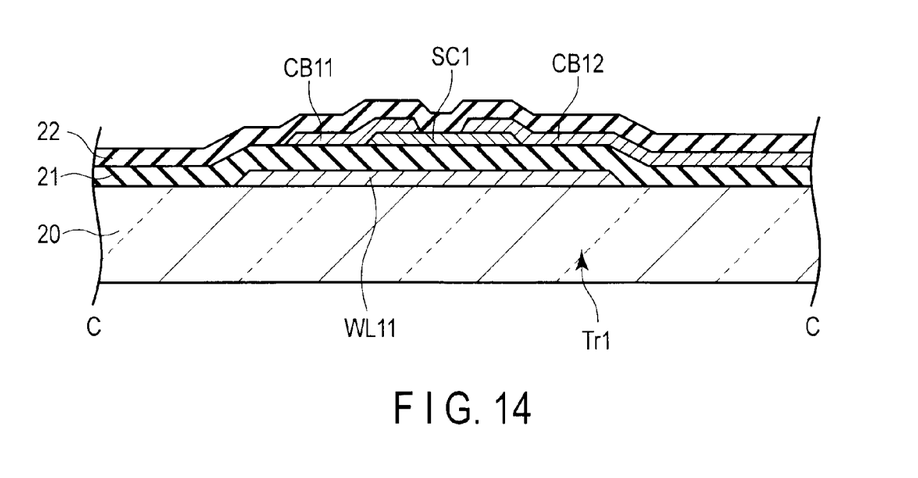
FIG. 14 is a cross-sectional view which schematically shows a cross-sectional structure, taken along line C-C, of the second resistor element shown in FIG. 12.

FIG. 14 is a cross-sectional view which schematically shows a cross-sectional structure, taken along line C-C, of the second resistor element R21 shown in FIG. 12. In this example, a description is given of the cross-sectional structure including the semiconductor layer SC1 of the thin-film transistor Tr1 in the second resistor element R21. Since the other cross-sectional structures taken along line C-C in FIG. 12, that is, the cross-sectional structure including the semiconductor layer SC2 of the thin-film transistor Tr2, the cross-sectional structure including the semiconductor layer SC3 of the thin-film transistor Tr3 and the cross-sectional structure including the semiconductor layer SC4 of the thin-film transistor Tr4, are the same as the cross-sectional structure including the semiconductor layer SC1 of the thin-film transistor Tr1, a description thereof is omitted.

The semiconductor layer SC1 is formed on the first interlayer insulation film 21 which covers the one end portion WL11. The connector CB11 is put in contact with a part of the semiconductor SC1. The connector CB12 is put in contact with another part of the semiconductor SC1, and is spaced apart from the connector CB11. The semiconductor layer SC1, connector CB11 and connector CB12 are covered with the second interlayer insulation film 22.

The semiconductor layer SC1 is formed of the same material as the semiconductor layer SC which is included in the above-described switching element. The connector CB11 and connector CB12 correspond to the second electrically conductive layer which is formed of the same material as the above-described source line.

In the second resistor element R2 having the above-described structure, the thin-film transistors Tr1 to Tr4 are turned on when a voltage exceeding a threshold value is applied to the one end portion WL11, the intermediate portion WL13 and the other end portion WL12 which correspond to the gate electrodes of the thin-film transistors Tr1 to Tr4, and their source-drain paths are rendered conductive.

According to the present embodiment with this structure, the entrance of static electricity to the active area DSP side can be suppressed by the guard ring wiring GR which is disposed along the substrate end 20S of the array substrate AR. Specifically, in the extension portion ARE of the array substrate AR, the guard ring wiring GR extends between the input pads IP and output pads OP of each of the IC mounting portions 111 to 114, and is connected to the first common terminal COM1 and second common terminal COM2. Thus, the static electricity, which has entered from the neighborhood (e.g. connection pads CP) of the input pads IP of the IC mounting portions 111 to 114, tends to be easily discharged to the guard ring wiring GR which is located relatively close to the input pads IP. Since the guard ring wiring GR includes a plurality of resistor elements, the energy of the static electricity, which has entered the guard ring wiring GR, is consumed by these resistor elements. Accordingly, the charge-up of the guard ring wiring GR can be suppressed, and further discharge of static electricity from the guard ring wiring GR to the active area DSP side can be suppressed. Thereby, it is possible to suppress the occurrence of a problem due to static electricity, for example, dielectric breakdown of various wiring lines, such as gate lines and source lines, or switching elements in the active area DSP.

In addition, according to the present embodiment, the guard ring wiring GR, which extends through the IC mounting portions, is located with a bias to the input pad IP side between the input pads IP and output pads OP. Hence, the guard ring wiring GR tends to easily receive the static electricity that has entered the input pads IP, and, conversely, can suppress discharge of static electricity from the guard ring wiring GR to the output pads OP. Therefore, it is possible to suppress the entrance of static electricity from the output pads OP to the active area DSP side, and the occurrence of a problem due to the static electricity discharge in the active area DSP.

Moreover, in the present embodiment, in the guard ring wiring GR that is configured such that the plural resistor elements are connected in parallel, even if one of the resistor elements is broken by static electricity, another path of static electricity can be secured via the other resistor element. Therefore, the breakdown voltage against the static electricity can be improved.

In particular, in the present embodiment, the guard ring wiring GR includes a plurality of paths (e.g. branched first wiring portion and second wiring portion) in the midway portions B1 to B3. According to experiments by the inventor, electrostatic breakdown voltage tests were conducted in the case (comparative example) in which a guard ring wiring GR without a plurality of paths was formed, and the case where a guard ring wiring GR including the midway portions B1 to B3, each of which was branched into two paths, was formed, as described in the present embodiment. It was confirmed that the electrostatic breakdown voltage in the present embodiment was improved and made higher by about 16% than the electrostatic breakdown voltage in the comparative example.

In the present embodiment, in the guard ring wiring GR which is configured such that each of the midway portions B1 to B3 has a plurality of paths and the respective paths have different electrostatic breakdown voltages, it is possible to improve the electrostatic breakdown voltage of the guard ring wiring GR and to suppress the entrance of static electricity from the output pads of the IC mounting portions to the active area.

Specifically, in each of the midway portions B1 to B3, the electrostatic breakdown voltage of the first wiring portion, in which the first resistor element R1 is provided, is lower than the electrostatic breakdown voltage of the second wiring portion, in which the second resistor element R2 is provided.

If all the paths constituting the midway portions were formed of wiring portions which are connected via the second resistor elements R2 which tend to have high electrostatic breakdown voltages, it would be likely that the electrostatic breakdown voltage of the guard ring wiring GR can be improved. In this case, however, since the electrostatic breakdown voltage in the midway portions is excessively high, there is a concern that the flow of static electricity is hindered and the static electricity having nowhere to go may be discharged to undesirable locations such as the output pads of the IC mounting portions.

Hence, by applying the structure of the midway portions in which the electrostatic breakdown voltage in the midway portions is not merely increased, but in which the wiring portions configured to have different electrostatic breakdown voltages are combined (i.e. the midway portion including at least the wiring portion in which the first resistor element R1 is provided and the wiring portion in which the second resistor element R2 is provided), it is possible to improve the electrostatic breakdown voltage of the guard ring wiring GR and to effectively suppress the entrance of static electricity from the output pads of the IC mounting portions to the active area.

The present embodiment has been described, taking the liquid crystal display device as an example of the flat panel display device. However, the embodiment is applicable to various types of flat panel display devices, such as an organic electroluminescence display device and a plasma display device, which need to have countermeasures to static electricity.

As has been described above, according to the present embodiment, there can be provided a flat panel display which can suppress defects due to static electricity.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. A flat panel display comprising:
   an insulative substrate;
   a first mounting portion including a first input pad and a first output pad;
   a second mounting portion including a second input pad and a second output pad;
   a first common terminal and a second common terminal, which have a common potential and which are formed above the insulative substrate; and a guard ring wiring which is formed above the insulative substrate and which extends from the first common terminal to the second common terminal, said guard ring wiring passing between the first input pad and the first output pad of the first mounting portion, passing between the second input pad and the second output pad of the second mounting portion, and including a first resistor element of a first resistance value and a second resistor element of a second resistance value which is higher than the first resistance value, wherein the guard ring wiring further includes a third resistor element of the second resistance value, wherein the second resistor element is formed between the first common terminal and the first mounting portion, and wherein the third resistor element is formed between the second common terminal and the second mounting portion.

2. The flat panel display of claim 1, further comprising a gate line formed above the insulative substrate, the gate line extending in a first direction in an active area configured to display an image, and a source line extending in a second direction crossing the first direction, wherein the guard ring wiring is formed outside the active area above the insulative substrate, and is electrically insulated from the gate line and the source line.

3. The flat panel display of claim 1, wherein the guard ring wiring is positioned with a bias to the first input pad side between the first input pad and the first output pad and is positioned with a bias to the second input pad side between the second input pad and the second output pad.

4. The flat panel display of claim 1, wherein the guard ring wiring includes a midway portion between the first mounting portion and the second mounting portion, the midway portion having a first wiring portion which is electrically connected via the first resistor element, and a second wiring portion which is electrically connected via the second resistor element, the second resistor element being in parallel with the first resistor element.

5. The flat panel display of claim 1, wherein the first resistor element is a jumper portion which is formed of an oxide electrically conductive material.

6. The flat panel display of claim 5, further comprising a pixel electrode formed above the insulative substrate, wherein the first resistor element is formed of a same material as the pixel electrode.

7. The flat panel display of claim 1, wherein the second resistor element is a short ring including a thin-film transistor.

8. The flat panel display of claim 7, further comprising a switching element including a first semiconductor layer formed above the insulative substrate, wherein the thin-film transistor has a second semiconductor layer formed of a same material as the first semiconductor layer.

9. A flat panel display comprising:

an insulative substrate including a substrate end extending in a first direction;

output pads arranged in the first direction;

input pads arranged in the first direction, the input pads being closer to the substrate end side than the output pads;

connection pads arranged in the first direction and connected to the input pads, the connection pads being closer to the substrate end side than the input pads; and a guard ring wiring formed above the insulative substrate and extending in the first direction between the output pads and the input pads, the guard ring wiring including a plurality of resistor elements and extending from a first common terminal to a second common terminal, wherein the plurality of resistor elements include a first resistor element of a first resistance value and a second resistor element of a second resistance value, which is higher than the first resistance value, and wherein the guard ring wiring includes a midway portion between a first mounting portion and a second mounting portion, the midway portion having a first wiring portion which is electrically connected via the first resistor element, and a second wiring portion which is electrically connected via the second resistor element, the second resistor element being in parallel with the first resistor element.

10. The flat panel display of claim 9, further comprising a gate line formed above the insulative substrate, the gate line extending in the first direction in an active area configured to display an image, and a source line extending in a second direction crossing the first direction, wherein the guard ring wiring is formed outside the active area above the insulative substrate, and is electrically insulated from the gate line and the source line.

11. The flat panel display of claim 9, wherein the guard ring wiring is positioned between the input pad and the output pad, with a bias to the input pad side.

12. The flat panel display of claim 9, further comprising the first common terminal and the second common terminal, which have a common potential and are formed above the insulative substrate, wherein the guard ring extends between the first common terminal and the second common terminal.

13. The flat panel display of claim 9, wherein the first resistor element is a jumper portion which is formed of an oxide electrically conductive material.

14. The flat panel display of claim 13, further comprising a pixel electrode formed above the insulative substrate, wherein the first resistor element is formed of a same material as the pixel electrode.

15. The flat panel display of claim 9, wherein the second resistor element is a short ring including a thin-film transistor.

16. The flat panel display of claim 15, further comprising a switching element including a first semiconductor layer formed above the insulative substrate, wherein the thin-film transistor has a second semiconductor layer formed of the same material as the first semiconductor layer.

17. A flat panel display comprising:

an insulative substrate;

a gate line formed above the insulative substrate, the gate line extending in a first direction in an active area configured to display an image;

a source line formed above the insulative substrate, the source line extending in a second direction crossing the first direction in the active area; and a guard ring wiring which is formed above the insulative substrate, outside the active area, includes a plurality of resistor elements, and is electrically insulated from the gate line and the source line.

18. The flat panel display of claim 17, further comprising a first common terminal and a second common terminal, which have a common potential and are formed above the insulative substrate, wherein the guard ring wiring extends between the first common terminal and the second common terminal.

19. The flat panel display of claim 17, further comprising:
an output pad formed outside the active area, closer to the active area side than the guard ring wiring is to the active area side; and
an input pad formed closer to a substrate end side than the guard ring wiring is to the substrate end side.

20. The flat panel display of claim 19, wherein the guard ring wiring is positioned between the input pad and the output pad, with a bias to the input pad side.

21. The flat panel display of claim 17, wherein the plurality of resistor elements include a first resistor element of a first resistance value and a second resistor element of a second resistance value, which is higher than the first resistance value.

22. The flat panel display of claim 21, wherein the guard ring wiring includes a midway portion between a first mounting portion and a second mounting portion, the midway portion having a first wiring portion which is electrically connected via the first resistor element, and a second wiring portion which is electrically connected via the second resistor element, the second resistor element being in parallel with the first resistor element.

23. The flat panel display of claim 21, wherein the first resistor element is a jumper portion which is formed of an oxide electrically conductive material.

24. The flat panel display of claim 23, further comprising a pixel electrode formed in the active area above the insulative substrate,
wherein the first resistor element is formed of a same material as the pixel electrode.

25. The flat panel display of claim 21, wherein the second resistor element is a short ring including a thin-film transistor.

26. The flat panel display of claim 25, further comprising a switching element including a first semiconductor layer formed in the active area above the insulative substrate, the switching element being electrically connected to the gate line and the source line,
wherein the thin-film transistor has a second semiconductor layer formed of a same material as the first semiconductor layer.

27. A flat panel display comprising:
an insulative substrate;
a first mounting portion including a first input pad and a first output pad;
a second mounting portion including a second input pad and a second output pad;
a first common terminal and a second common terminal, which have a common potential and which are formed above the insulative substrate; and
a guard ring wiring which is formed above the insulative substrate and which extends from the first common terminal to the second common terminal, said guard ring wiring passing between the first input pad and the first output pad of the first mounting portion, passing between the second input pad and the second output pad of the second mounting portion, and including a first resistor element of a first resistance value and a second resistor element of a second resistance value which is higher than the first resistance value,
wherein the guard ring wiring includes a midway portion between the first mounting portion and the second mounting portion, the midway portion having a first wiring portion which is electrically connected via the first resistor element, and a second wiring portion which is electrically connected via the second resistor element, the second resistor element being in parallel with the first resistor element.

28. The flat panel display of claim 27, further comprising a gate line formed above the insulative substrate, the gate line extending in a first direction in an active area configured to display an image, and a source line extending in a second direction crossing the first direction,
wherein the guard ring wiring is formed outside the active area above the insulative substrate, and is electrically insulated from the gate line and the source line.

29. The flat panel display of claim 27, wherein the guard ring wiring is positioned with a bias to the first input pad side between the first input pad and the first output pad and is positioned with a bias to the second input pad side between the second input pad and the second output pad.

30. The flat panel display of claim 27, wherein the first resistor element is a jumper portion which is formed of an oxide electrically conductive material.

31. The flat panel display of claim 30, further comprising a pixel electrode formed above the insulative substrate,
wherein the first resistor element is formed of a same material as the pixel electrode.

32. The flat panel display of claim 27, wherein the second resistor element is a short ring including a thin-film transistor.

33. The flat panel display of claim 32, further comprising a switching element including a first semiconductor layer formed above the insulative substrate,
wherein the thin-film transistor has a second semiconductor layer formed of a same material as the first semiconductor layer.

* * * * *